March 15, 1966     A. HANSSON     3,239,922
METHOD OF MAKING CELLULAR STRUCTURE
Filed March 21, 1962     4 Sheets-Sheet 1
FIG.1
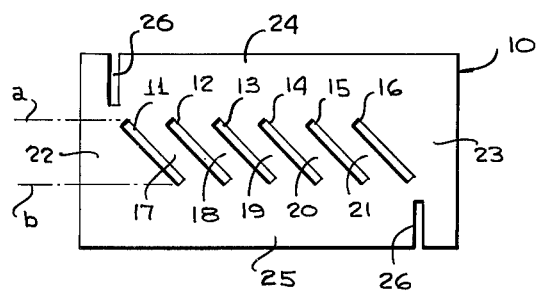
FIG.2
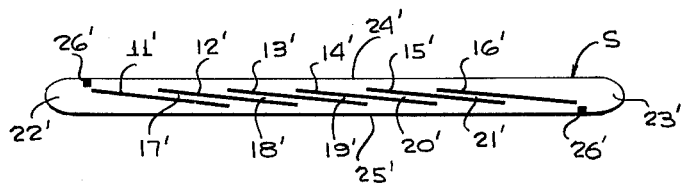
FIG.3
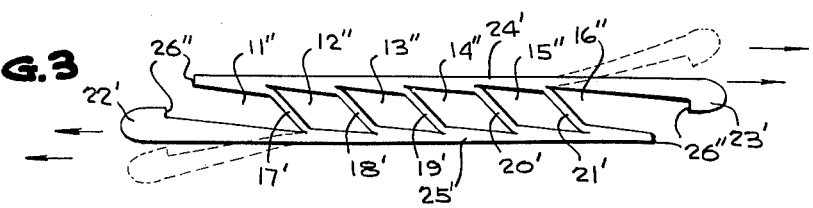
FIG.4
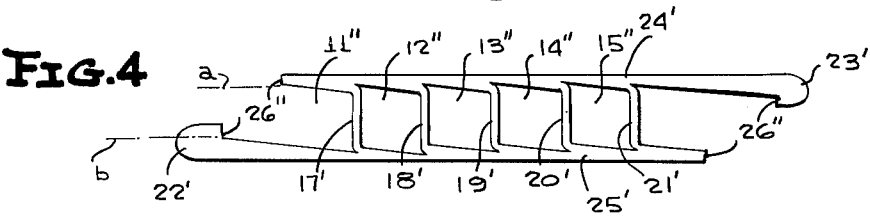
FIG.5
FIG.6    FIG.6-A
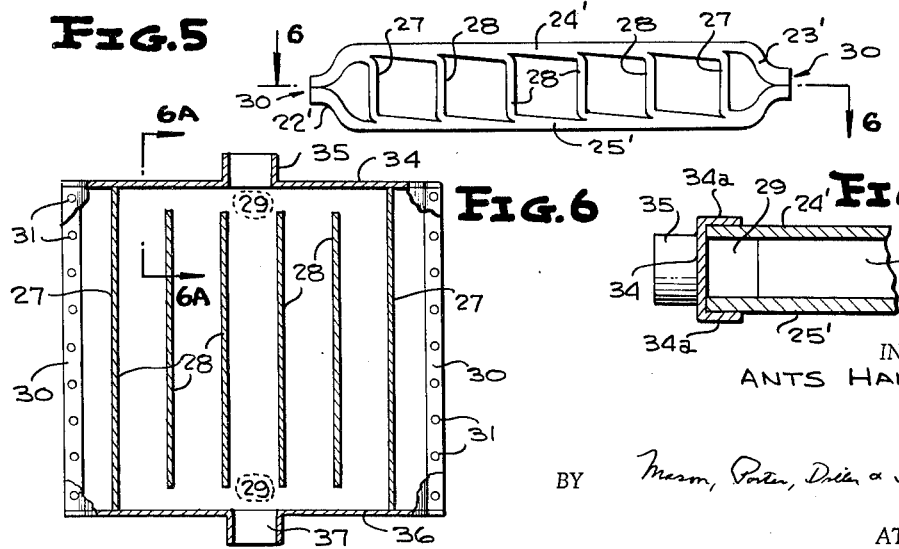
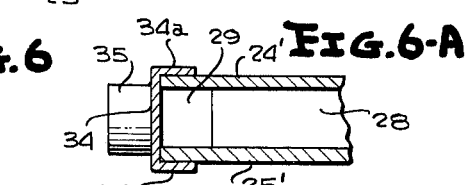
INVENTOR
ANTS HANSSON
BY
ATTORNEYS March 15, 1966  A. HANSSON  3,239,922
METHOD OF MAKING CELLULAR STRUCTURE
Filed March 21, 1962  4 Sheets-Sheet 2

INVENTOR
ANTS HANSSON

BY *Mason, Porter, Diller & Stewart*
ATTORNEYS

March 15, 1966 — A. HANSSON — 3,239,922
METHOD OF MAKING CELLULAR STRUCTURE
Filed March 21, 1962 — 4 Sheets-Sheet 3

INVENTOR
ANTS HANSSON
BY Mason, Porter, Diller & Stewart,
ATTORNEYS

March 15, 1966  A. HANSSON  3,239,922
METHOD OF MAKING CELLULAR STRUCTURE
Filed March 21, 1962  4 Sheets-Sheet 4
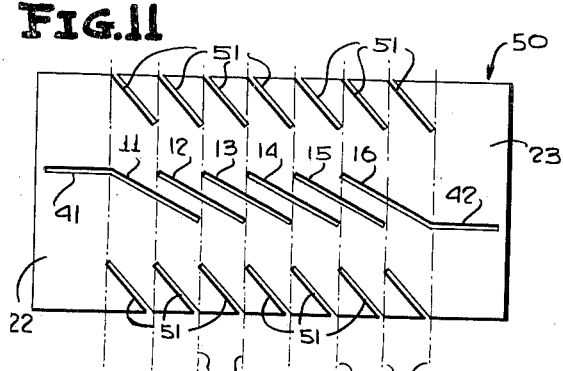
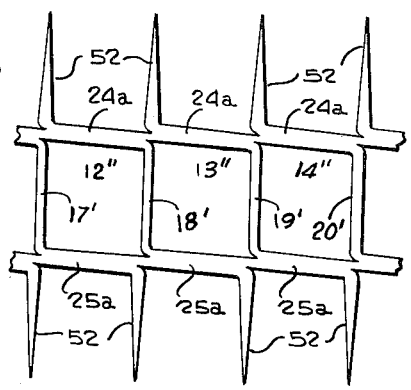
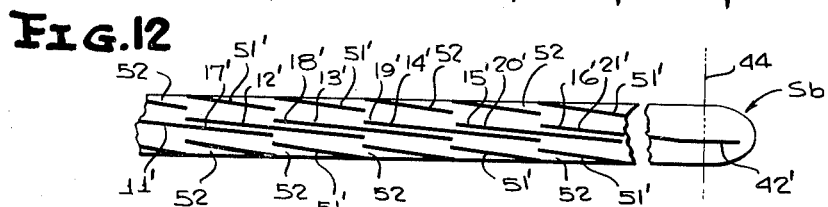
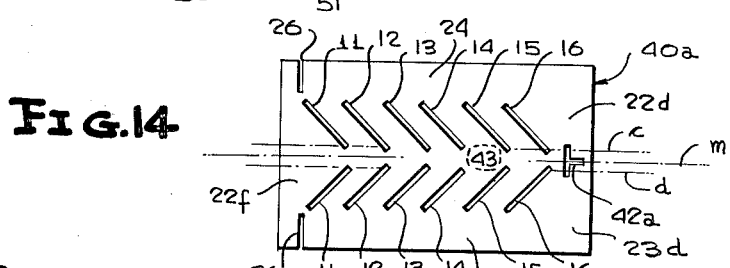
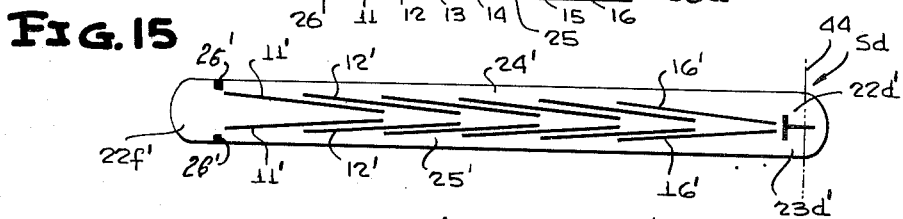
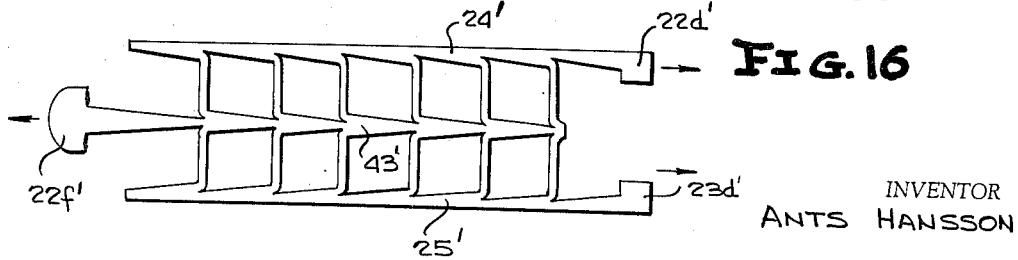
INVENTOR
ANTS HANSSON
BY Mason, Porter, Diller & Stewart,
ATTORNEYS United States Patent Office 3,239,922
Patented Mar. 15, 1966

3,239,922
METHOD OF MAKING CELLULAR STRUCTURE
Ants Hansson, Evanston, Ill., assignor to Continental Can Company, Inc., New York, N.Y., a corporation of New York
Filed Mar. 21, 1962, Ser. No. 181,347
14 Claims. (Cl. 29—157.3)

This invention relates to a procedure of making structures having a plurality of channels therein, and to the products so made.

It is often desired to provide a conduit or other body having internal channels separated from one another by partition walls which are integral with the outer walls. Such bodies have been prepared by separately forming the outer and partition walls and then joining the same by rivets, solder, welded beads, or cements. Heating incidental to such joinings can destroy a desirable quality of the original sheets such as work hardening effects and grain size; and the junction seams are not homogeneous with the wall metal, being subject to attack by substances toward which the wall metal is immune, or having different coefficients of thermal expansion, or having a differing thermal or electrical conductivity. Further, there are obvious minimum size limitations when internal access is necessary during the joining.

According to the present invention such bodies may be made with the parts integral with one another, by rolling a billet which has overlapping internal discontinuities separated by metal portions integrated with external walls, and then shifting the reduced wall portions relative to one another.

An object of the invention is a method for the production of such a body with a plurality of internal passages separated by partitions which are integral and monolithic with the outer walls.

Another object is the production of a rolled strip having a plurality of internal overlapping discontinuities separated by metal portions integrated with the metal at the surfaces of the strip and having weakenings at the surfaces whereby the surface metal portions can be separated at lines spaced from respective edges, so that the strip can be opened or expanded to the cellular form by simple forces applied to the metal at the edges of such surfaces.

A further object is the production of a rolled strip having a plurality of internal overlapping discontinuities integrated with the metal at the surface of the strip, and whereby the strip can be opened or expanded to the cellular form by trimming away the edges of the strip and causing the metal at one surface of the strip to move laterally relative to the metal at the other surface thereof.

A further object is the production of an article having a plurality of internal channels separated from one another by partition walls which are integral with the outer closing walls, and having externally projecting fins which are also integral with such outer closing walls.

A further object is a process of producing a rolled strip having a plurality of internal overlapping metal walls separated from one another by intervening discontinuities, said metal walls at their longitudinal edges being integral with metal portions extending from side to side of the strip, and also having longitudinal weaknesses located adjacent and parallel to the metal walls nearest the lateral edges of the strip and effective upon stressing to effect longitudinal severance of said metal portions along predetermined lines whereby part of one said metal portions can be shifted laterally and away from a part of the other of said metal portions.

A further object is a simple manner of initiating the raising of such external fins.

With these and further objects in view, as will appear in the course of the following description and claims, examples of practice of the invention are shown in the accompanying drawings, in which:

FIG. 1 is an end view of a billet prepared under the practice of this invention;

FIG. 2 is an end view of a section of the strip product made by rolling the billet of FIG. 1;

FIG. 3 is a like view, showing the surface separations and a partial opening of the strip of FIG. 2;

FIG. 4 is a like view, showing the strip opened until the septa are essentially at right angles to the surface layers;

FIG. 5 is a like view, showing the product of trimming and joining the lateral edges of the surface;

FIG. 6 is a sectional view substantially on line 6—6 of FIG. 5, with end closures in place;

FIG. 6a is a partial sectional view substantially on line 6a—6a of FIG. 6;

FIG. 11 is a view similar to that of FIG. 1, showing a third form of billet, for producing an article having a plurality of internal channels and pluralities of external fins;

FIG. 12 is a view similar to that of FIG. 2, showing the strip product of rolling the billet of FIG. 11;

FIG. 13 is a like view at a larger scale, of a part of the article made by expanding the strip of FIG. 12;

FIG. 14 is a view similar to that of FIG. 1, showing a fourth form of billet;

FIG. 15 is a view similar to that of FIG. 2, showing the strip product of rolling the billet of FIG. 14;

FIG. 16 is a view showing an article made by expanding the strip of FIG. 15;

Figure 7:
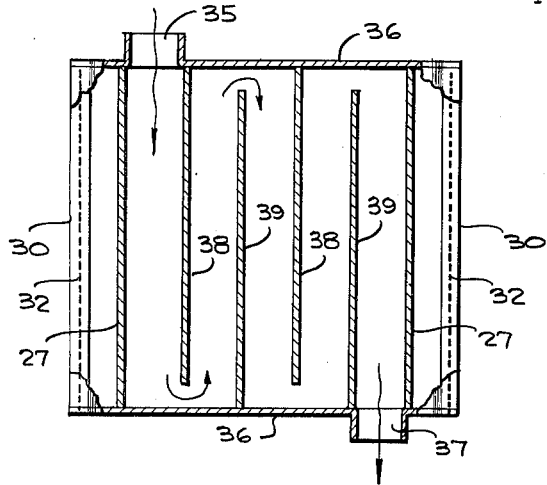
FIG. 7 is a sectional view corresponding to FIG. 6, but showing different end closures and excisions from the septa.

In the form of practice shown in FIGS. 1 to 4, a billet 10 is prepared, illustratively of rectangular cross-section, and provided with a plurality of inclined and overlapping internal channels 11, 12, 13, 14, 15, 16 which have parallel walls with original billet metal between pairs of the channels, as shown at 17, 18, 19, 20, 21. Therewith, the billet has integrated solid metal lateral portions 22, 23 at its ends, and upper and lower portions 24, 25 of solid metal. The channels are wider than they are thick and extend parallel to one another along the length of the billet. Longitudinal grooves or notches 26 are formed in the upper and lower faces of the billet to provide weakenings therein in line with the outermost edges of the two sidemost channels 11, 16: these notches extending for, for example, about one-half of the thickness of the respective metal face portions 24, 25. The grooves or notches 26 preferably have their base or root located adjacent to the end of sidemost channels 11 and 16 nearest to the respective lateral edge of the billet 10.

Such billets may be prepared by casting molten metal into a mold and around central portions of non-bonding and removable cores positioned therein. For example, in making an aluminum billet, the cores can be flat pieces of stainless steel preferably having thin coatings of a weld-preventing material such as a refractory oxide. Such cores may be single sheets of the cross-section for providing a respective channel and later removed by stretching until their sections are smaller than the respective channel in the ingot: or the cores may be composite, e.g., each being of three pieces having interfitting ribs and grooves at their interfaces, the central piece being convergently tapered and the side pieces having the interfitted edges correspondingly tapered, so that the central piece can later be easily withdrawn and thereby free the side pieces for like withdrawal. When the ingot is cold, the cores are engaged at their projecting ends and stretched by tension thereon so they are removed. Flattened hollow tubes may be positioned in inclined overlapping relation in a mold, and ingot metal cast around them for bonding them to an integral whole ingot: this practice being of particular advantage when the tubes are of a cladding metal such as pure aluminum with the cast metal being an aluminum alloy, or of stainless steel when the cast metal is cheaper carbon steel. Another procedure is to prepare plain strips of cross-sectional dimensions at least equal to those of the inter-channel metal portions 17, 18, 19, 20, 21 of FIG. 1, coating most of one surface of each strip with a resist such as flame-sprayed alumina or other refractory material, while leaving a longitudinal marginal portion bare and of bondable metal, placing a pack of such strips in a mold while leaving such marginal portion exposed along with a like marginal width at the other surface of the individual strip at the other side of the pack, and casting metal around the pack for bonding to the exposed margins of the strips and therewith presenting the resist coatings as the channels 11, 12, 13, 14, 15, 16 of FIG. 1. Such billets may also be prepared by extruding through so-called blind hole dies, in which the metal is forced along like cores and passes therefrom in the illustrative multi-channeled form.

This billet 10 of FIG. 1 is then subjected to a schedule of rolling and heat treatment, after a suitable antiwelding resist material has been formed or is present in the channels 11, 12, 13, 14, 15 and 16. Such resist may also be employed in the notches 26, but is not usually necessary, noting that surface lubricants are customarily employed in rolling. Suitable resists are metal salts such as sodium and barium chloride which undergo the phenomenon called cold flow under the pressure and temperature of rolling. Organic high molecular substances such as silicones, metal stearates, polymers of ethylene linkage structure, polycarbonates, epoxy resins, and phenol aldehyde resins are usable. Dependent upon the metal and the conditions of rolling, refractory powder resists such as mica, talc, graphite, aluminum and other metal oxides can be employed.

As a result of a schedule of hot and cold rolling, the strip S of FIG. 2 is produced, in which the printed numerals are employed as in FIG. 1 to show the relationship of the corresponding parts after they have been reduced by rolling. As a result of the reduction in thickness with extension of length, the channels become essentially closed upon thin residual layers of the likewise extended resist material, and their angles relative to the billet surfaces are flattened. The metal portions 17′–21′ are correspondingly reduced in thickness in the strip S. The notches 26′, are likewise closed and reduced in height but remain essentially opposite the outer ends of the channel residues 11′, 16′.

The strip has smooth surfaces, and the locations of the channel residues 26, are essentially invisible; and the residues 11′, 12′, 13′, 14′, 15′, 16′ are likewise essentially invisible at exposed cross-sections produced by cutting the strip transversely. However, these external notch residues 26′, provide weaknesses in the rolled strip, and can now be broken through by flexing as indicated in FIG. 3, so that the separation occurs along longitudinal lines determined by the positions of the notches 26, in the original billet of FIG. 1, and then by tension, as shown by the arrows, in opposite directions upon the lateral portions 22′, 23′ of the strip, the continuous surface metal portions 24′, 25′ are caused to shift laterally with respect to one another, wherewith the metal wall portions or layers 17′–21′, located between pairs of the resist residues of the original channels, rock essentially about their end connections to the surface metal as fulcra. Therewith the distances between the rolled surfaces of the strip S are increased.

Ultimately, as shown in FIG. 4, the metal wall portions or septa 17′–21′ can be brought to essentially right angles to the outer surfaces of the strip, and therewith form a series of channels 12″–15″ which are of a general quadrilateral shape. The upper and lower walls of these passages or channels are not parallel to the outer surfaces of the strip S, but are at an angle thereto corresponding to the angle occupied by the resist residues of the channels 11′–16′ as shown in FIG. 2. The walls 17′–21′ are of essentially uniform thickness in the illustrative form.

The product thus made may have any desired number of channels 11′–16′ in the original billet, and a corresponding number, less two, of passages 12″–15″ in the finished structure. The height of the respective walls 17′–21′, and thus of the individual passages, is determined by the amount of overlap of the channels 11–16 in the original billet: and the ratio of thickness of the individual walls 17′–21′ to the average thickness of the surface metal portions 24′, 25′ of the opened strip is determined by the ratio of the distance between lines $a$ and $b$ to the total billet thickness, noting that the lines $a$ and $b$ extend tangent to the tops and bottoms of the channels in the illustrative form, and define the surface metal portions 24′, 25′ which extend from side to side of the billet, as compared to the central portion between the lines $a$ and $b$ which contains the overlapping channels.

Such a structure forms a member which can be employed for structural purposes, as a wall or stiffener: and can also be used in the form shown as a conduit, for example, for heat exchange.

Where small heat exchange bodies, such as those for the evaporators of mechanical refrigerators, are to be made, the extending thicker ends 22′, 23′ of the opened strip of FIG. 4 can be cut away, leaving portions extending laterally from the walls 17′, 21′, and these portions can then be brought together as shown in FIG. 5 and joined by cement or by welding.

A heat exchange body having an upper inlet and a bottom outlet is shown in FIG. 6 as comprising a structure prepared from a body as in FIG. 5, with the end septum walls 27 left for the full length, while the intervening walls 28 have their ends excised or cut away, between the surface metal portions 24′, 25′ to provide connecting spaces 29. The ends of the body are then provided with closing walls 34, 36 having respective conduit connections 35, 37. These end walls may be assembled as shown in FIG. 6a, where an end wall 34 has the turned flanges 34a closely fitting the surface metal portions 24, 25 and sealed thereto. In the structure of FIG. 6, a fluid entering at 35 is distributed in the space 29, which operates as a manifold, and then passes downward in the several passages, being collected again at a lower manifold portion 29, and passing out through the conduit connection 37. In FIG. 6, the connection at the pinched lips 30 is illustrated by spot-welding at points 31.

In the form of heat exchange device shown in FIG. 7, the general section and the end septum walls 27 are as in FIG. 6, but in this case alternate intermediate walls 38, 38 are clipped at the bottom and the intervening walls 39, 39 clipped at the top, all between the surface portions 24′, 25′. End walls 34, 36 with conduit connections 35, 37 are provided as before. Illustratively, in this form, the pinched lips 30 are connected by a roll-forged seam 32 at each lateral edge. In this structure, a fluid entering at connection 35 passes in zigzag fashion as shown by the arrows, and issues from the other conduit connection 37.

The same principle can be employed for providing a body having a number of rows of longitudinal passages. Thus, in FIGS. 8–10, two such rows are provided.

Figure 8:
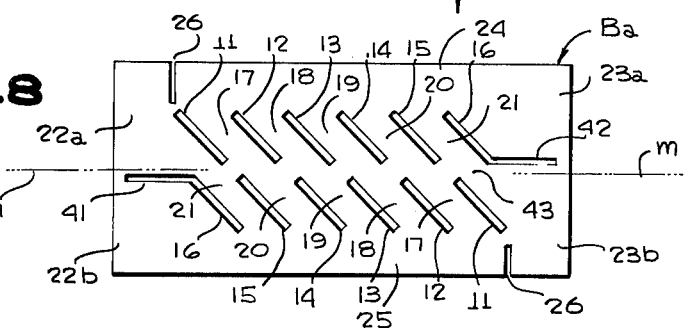
FIG. 8 is a view similar to that of FIG. 1, showing a form of billet for providing cells in two rows.

In FIG. 8, the billet B*a* is provided with two rows of inclined channels 11–16, each with the intervening metal portions 17–21. The longitudinal notching grooves 26, are provided as before, in alignment with the outer ends of the lateral channels 11: while the other lateral channels 16 are extended by horizontal branches 41, 42 for the lower and upper rows of channels, noting that these branches 41, 42 terminate short of the lateral sides of the billet B*a*. Above the respective branches 41, 42 are the metal end portions 22*a*, 23*a*: while below them are the metal end portions 22*b*, 23*b*. The roll engaging surfaces of the ingot are provided by the solid metal portions 24, 25 as in FIG. 1, these being in parallel planes. At the median plane of the billet, represented by the dotted line M—M, there is also a continuous metal portion 43, extending from side to side of the billet.

Figure 9:
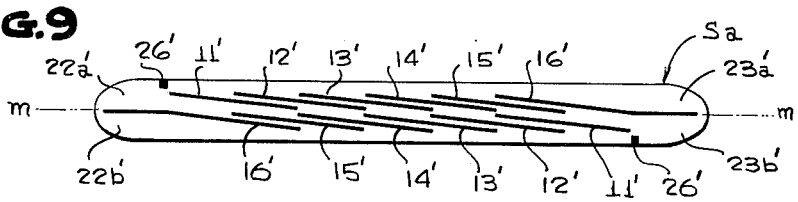
FIG. 9 is a view similar to that of FIG. 2, of the strip product from the billet of FIG. 8.

Upon rolling this billet to the strip S*a* as shown in FIG. 9, the product is much as in FIG. 2, except that two sets of overlapped resist residues respectively above and below the median plane M—M are provided from the channels 11–16 with intervening metal portions 17–21. The surfaces of the strip S*a* of FIG. 9 are planes and are provided by the metal 24, 25: while a median continuous strip of metal extends from side to side, between the two rows of resist residues.

Figure 10:
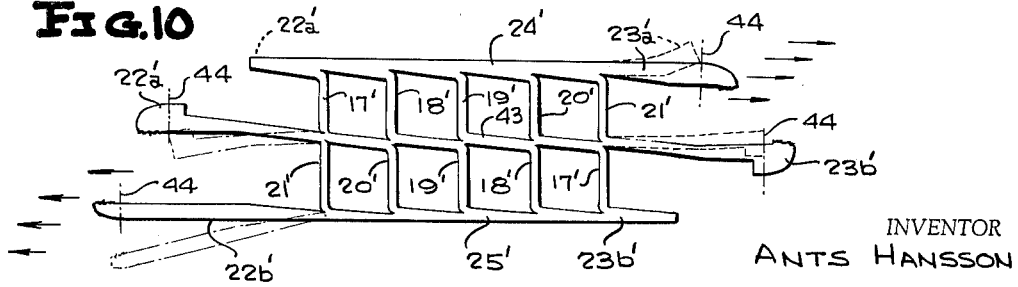
FIG. 10 is a view at a larger scale showing the expansion of the strip of FIG. 9.

For opening the strip of FIG. 9, its lateral edges may be cut away at planes illustrated by the upright lines 44, these cuts extending through the residues of the channel extensions 41, 42, and thereby giving access to these channel residues at the edges of the strip. By bending the edges of the strip to separate the remaining parts of the metal portions 22*a'*, 22*b'* and 23*a'*, 23*b'*, and exerting tensions on the portions 22*b'* and 23*a'* as indicated by the arrows, the structure may be opened to the form shown in FIG. 10. Therewith, opposing tension on the parts 22*a'*, 23*b'* can be employed to assure the proper positioning of the intervening walls 17'–21' of the two series shown. Here, as with FIG. 4, the individual walls 17'–21' are of uniform thickness in the illustrative practice and are directed at right angles to the outer surfaces provided by the metal portions 24', 25', noting that the inner surfaces of these metal portions have the inclined direction as before. The opened structure thus has the two rows of channels as shown in FIG. 10.

By employing more than two rows of channels 11–16, it is obviously feasible to prepare a cellular body having any number of rows of channels as may be desired.

The principle can also be employed for the making of bodies having internal passages and external fins.

In the practice of FIGS. 11 to 13, the billet 50 has the inclined overlapping channels 11–16 as before, with the end channels having the extensions 41, 42. Between these channels are the metal portions 17–21 as before. Inclined grooves 51 are cut into the upper and lower surfaces of the billet 50 and, in the illustrative form, the grooves are slits of uniform width and depth with the inner ends of the grooves 51 respectively aligned with the ends of the internal channels 11–16, as shown by the dotted lines *c*.

When the billet of FIG. 11 is rolled, with anti-welding resist in the channels 11–16, and preferably also in the grooves 51, a strip S*b* as in FIG. 12 is produced in which the internal residues 11'–16' have the metal wall portions 17'–21' between them: and a series of metal scales 52 are formed on the upper and lower surfaces of the strip S*b* of FIG. 12, overlying the respective residues 51' of the grooves 51. When the strip S*b* is cut along planes such as that shown by line 44 with intersection of the residues of channel portions 41, 42 at the two edges, and opened, a structure as in FIG. 13 can be formed. Therewith, the scales 52 have been raised substantially to right angles and thus provide longitudinally extending fins, parallel to one another and to the septum walls 17', 18', 19', 20', provided by the metal from the corresponding parts of the billet in FIG. 11. Between the septum walls and the fins are continuous laterally extending metal portions 24*a*, 25*a* which are of essentially uniform thickness between the fins, but are inclined relative to the general horizontal lateral plane of the body shown in FIG. 13, in general as described above for FIGS. 4 and 10. Between the internal walls 17', 18', 19', 20' are the individual channels 12", 13" and 14".

As an illustrative practice under FIGS. 1–4, the billet may be three inches thick after scalping. The channels 11–16 can be one-eighth of an inch thick, and 1.4 inches wide so that the distance between lines *a* and *b* is about one inch with the channels extending at an angle of about 45 degrees to the horizontal and thus overlapping by half their respective horizontal extensions. When this is rolled to a final strip S as in FIG. 2 having a thickness of 0.040 inch, the face layers 24', 25' have an average thickness of 0.015 inch each, while the septum walls 17'–21' are about 0.010 inch each, noting that their surfaces are at a very small angle relative to the strip surfaces. These walls overlap, in the strip, by about one inch: so that when the strip is opened into the channeled body of FIG. 4, the internal wall spacing of the respective upper and lower body walls is about one inch: and the quadrilateral passages have a section of about one inch by one inch. With the same dimensions in FIG. 11, and the surface grooves 51 thin and cut for about half the depth of the surface metal, the cell dimensions are the same, and the fins 52 of FIG. 13 are about 0.007 inch thick at their bases and extend about an inch.

FIGS. 14 to 16 show a procedure like that of FIGS. 8 to 10, for producing articles having more than one row or layer of cells in its thickness. In FIGS. 14 to 16 the two rows of original channels 11–16 are arranged symmetrically or in herringbone fashion relative to one another, converging toward the median plane M. The billet 40*a* has the surface grooves 26, located opposite the outer ends of channels 11, and a further internal separation channel 42*a* is provided at the median plane M, illustratively of T shape with the stem directed toward but terminating short of the lateral surface of the billet, and with the cross-bar extending from the median plane toward the roll-engaged surfaces of the billet. This cross-bar thus is adjacent but spaced from the inner ends of the channels 16, with its ends above and below the planes *c*, *d* of the inner ends of the rows of channels. Upon rolling, the strip S*d* of FIG. 15 is formed: which, upon cutting along the plane of line 44, permits engagement of the two lateral masses 22*d'*, 23*d'* and the employment of laterally directed tensions thereon, opposed by engagement with the lateral mass 22*f'* at the other side, and the opening of the structure to the form shown in FIG. 16, noting that the weaknesses adjacent the mass 22*f'*, produced by the adjacency of the respective residues of a channel residue 11' and a groove 26' permit tearing or breakage so that the surface bodies 24', 25' are freed for movement from one another and from the median body 43'.

Figure 17:
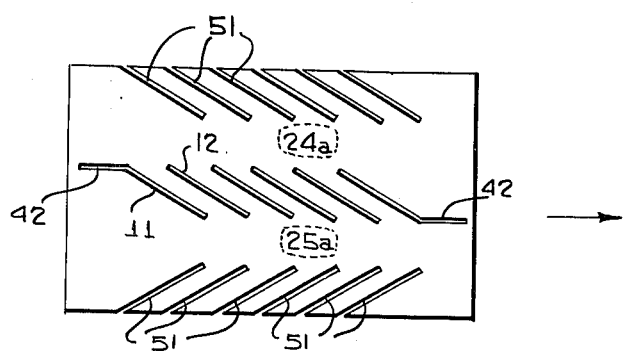
FIG. 17 is a view similar to that of FIG. 11, showing a fifth form of billet.
Figure 18:
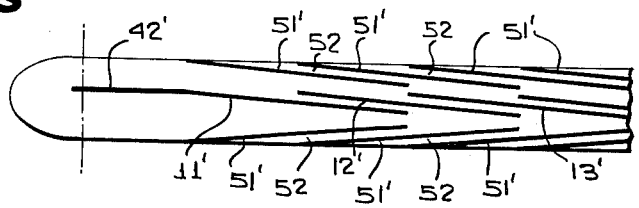
FIG. 18 is a view similar to that of FIG. 12, showing the strip product of rolling the billet of FIG. 17.
Figure 19:
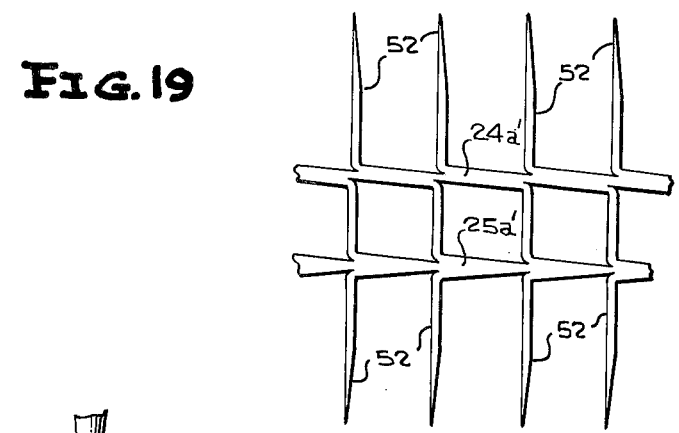
FIG. 19 is a like view on a larger scale, showing an article made by expanding the strip of FIG. 18.

FIGS. 17–19 show a practice corresponding to that of FIGS. 11–13, for forming articles having internal channels and external fins. Here the external grooves 51 are symmetrical, and with rolling by feeding the billet to the roll nip in the transverse direction shown by the arrow permit a preliminary widening of the billet before longitudinal rolling is done to bring the billet to the desired final thickness. Likewise, the surface grooves 51 can be at low angles to the roll-engaged surfaces, and can overlap one another as shown. The strip of FIG. 18, thus produced, can then be opened to the form shown in FIG. 19. When the grooves 51 of the billet overlap, as shown in FIG. 17, the ribs 52 are higher than the spacing between ribs, and can have the composite shape of essentially uniform thickness adjacent the body layers 24a', 25a', and tapering at their margins.

Figure 20:
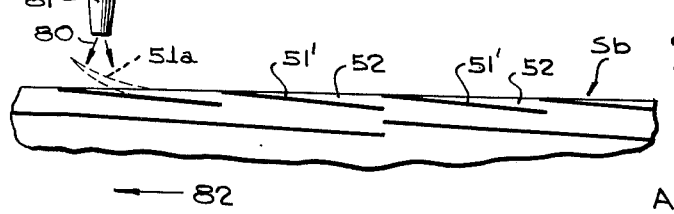
FIG. 20 is a view of a strip as in FIG. 2, showing the raising of a surface scale by shot peening.

The operation of opening the rolled strip into multicellular form is simple; and the fins when present can be raised by mechanical operations. A preferred manner of raising the fins is illustrated in FIG. 20, where a strip S*b* as in FIG. 12 is subjected to surface blasting with particles as in shot-peening, e.g. as indicated by the arrows 80. An air blast of such particles acts differentially on thicker and thinner parts of the scales, so that the edges are raised as shown by the dotted lines 51a, thus providing easy entry and engagement with their lower surfaces by knife-like edges for completing the lifting to the upright position without damage to the edges. Such shot-peening and edge lifting can be effected by moving the article opposite a transverse row 81 of blast nozzles, e.g. in the direction of the arrow 82.

The ingots can be prepared in various ways, and billets prepared other than by casting can be employed for the purpose. For example, metal strips of a material not bonded by the ingot metal can be held spaced in proper position in an ingot mold, and the ingot metal cast around them. For example, with aluminum, stainless steel strips can be employed having a dimension of one-eighth inch thick by 1.4 inches wide in the above illustrative practice. Alternatively, refractory resist powders, such as talc, chalk, mica, graphite, lime, aluminum oxide, and other refractory material can be formed into bars and positioned in a mold and the metal cast around them to form ingots of the desired cross-section. When the channels are thin, it is preferred to form them by the use of the non-welding metal core strips, which are then placed under tension in the cold ingot, so that they may be pulled therefrom and leave the channels: or by use of flattened integratable tubes: these channels can then be filled with anti-welding material, followed by closure of the ends of the ingot and subjection to the desired schedule of hot and cold-rolling.

The procedure permits the use of ductile metals such as aluminum and its alloys, steels of carbon and alloy types, copper and copper alloys including brass and bronze, tin, for making cellular structures with or without external fins, which are monolithic and present surfaces of the selected metal and thus having the same electrochemical resistance, and competent of retaining, in the finished article, the work-hardening effects of cold working.

The strips rolled from the billets can be coiled, stored, shipped and sold as articles of commerce. They can be cut to desired lengths and then expanded, before or preferably after raising the fins when present.

The invention is not limited to the illustrative practices and products shown, and may be employed in many ways within the scope of the appended claims.

What is claimed is:

1. The method of making a metal article having at least one internal channel, which comprises preparing a billet having a plurality of internal longitudinal channels disposed in laterally overlapping and essentially parallel relation to one another and at acute angles to roll-engaged surfaces of the billet, providing said billet adjacent each lateral edge with a weakening between the surface of said billet and the channel adjacent said lateral edge, rolling the billet whereby to reduce its thickness and thereby form a strip having overlapping internal discontinuities located between layers of continuous metal and with the weakening providing a restricted metal portion located between the channel ends and adjacent strip surfaces, exerting first forces to cause a surface metal layer of the strip to separate from other portions thereof at said weakening, and exerting second forces at one lateral edge of said layer and the other lateral edge of another metal portion of the strip whereby to cause the layer and said other portion to move apart and the metal between the discontinuities to form septa integral with said layer and other portion and defining at least one internal longitudinal channel in the article.

2. The method as in claim 1, in which the weakening is provided by forming an external groove having its longitudinal axis extending essentially parallel to the internal channels, said groove being located with its root adjacent the channel end nearest to the respective lateral edge of the billet.

3. The method as in claim 1, in which the weakening is provided by forming at least one of the sidemost channels with an extension essentially parallel to the roll-engaged surfaces and terminating near the adjacent edge of the billet.

4. The method as in claim 1, in which the billet comprises more than one row of said overlapping channels, and has continuous metal portions across the billet both above and below each row; and the weakening is provided by longitudinal external grooves located adjacent an end of a channel in a respective row and in which said first forces cause the strip to break at the weakenings and said second forces cause adjacent continuous metal portions to shift away from one another whereby to form an article having plural rows of internal channels.

5. The method as in claim 4, in which the overlapping channels of adjacent rows are formed parallel to one another.

6. The method as in claim 4, in which the overlapping channels of one row are formed so as to be directed at acute angles to the overlapping channels of an adjacent row and the channels of the adjacent rows are formed to converge at their adjacent edges.

7. The method as in claim 6, in which there is formed an even number of rows of channels, and in which the weakening is formed by longitudinal external grooves extending from each roll-engaged surface of the billet so that the groove roots are in proximity to the outer edges of channels of the outer rows and which outer edges are located nearer the adjacent billet edge than the inner edges of the same channels.

8. The method as in claim 6, in which the billet has an internal separation channel extending in the direction between the roll-engaged surfaces of the billet, and located adjacent to and spaced from the inner edges of converging sidemost channels of two adjacent rows, the upper and lower edges of said separation channel being located closer to the said billet surfaces than said inner edges of the said sidemost channels.

9. The method as in claim 8, in which said internal separation channel is of T shape, with the stem located at the median plane between said adjacent rows of channels and extending toward and terminating short of the adjacent sides of the billet, and cutting said billet in a plane perpendicular to and intersecting with said stem.

10. The method as in claim 1, in which the billet is formed with parallel surface grooves in a roll-engaged surface thereof with the roots of the grooves spaced from the respectively adjacent internal channels, in which the rolling is effective to reduce the metal between the surface grooves to provide surface scales, and raising said scales for forming fins projecting from the metal overlying the said internal channel.

11. The method as in claim 10, in which said grooves are formed in both roll-engaged surfaces of the billet, and the rolled strip is expanded and the scales raised to provide an article having internal channels and having external fins at both roll-engaged surfaces thereof.

12. The method as in claim 10, in which the grooves are slits of essentially uniform width with their walls directed at acute angles to the said roll-engaged surface.

13. The method of making a structure having projecting integral fins, which comprises providing a billet having spaced discontinuities in an exposed surface thereof, rolling the billet by roll contact with said surface whereby the material between the discontinuities form surface scales on the rolled product, and directing a jet of shot-like particles against said scales whereby to cause the same to bend away from underlying parts of the rolled product integral with the scales.

14. The method as in claim 13, in which the method includes the step of raising the bent scales and forming them as essentially planar fins projecting from said underlying parts.

References Cited by the Examiner

UNITED STATES PATENTS

| | | | |
|---|---|---|---|
| 545,953 | 9/1895 | Friedrich et al. | 80—11.3 |
| 677,986 | 7/1901 | Hobel. | |
| 2,234,850 | 3/1941 | Wallace. | |
| 2,247,199 | 6/1941 | Kritzer | 29—157.3 |
| 2,423,810 | 7/1947 | Goulding | 29—423 |
| 2,573,538 | 10/1951 | Brown | 165—170 |
| 2,656,160 | 10/1953 | Lyerly et al. | 165—170 |
| 2,711,382 | 6/1955 | Smith-Johannsen | 29—157.3 XR |
| 2,944,328 | 7/1960 | Adams | 29—157.3 |
| 2,996,792 | 8/1961 | Mackie | 29—157.3 |
| 3,010,202 | 11/1961 | Fromson | 29—157.3 |
| 3,092,470 | 6/1963 | Ripling | 29—528 |

FOREIGN PATENTS 1,191,345   4/1959   France.

WHITMORE A. WILTZ, *Primary Examiner.*

RICHARD H. EANES, *Examiner.*